United States Patent
Watanabe et al.

(10) Patent No.: US 9,643,517 B2
(45) Date of Patent: May 9, 2017

(54) METHOD OF CONTROLLING FUEL CELL VEHICLE

(75) Inventors: Kazunori Watanabe, Mooka (JP); Takuya Shirasaka, Sakura (JP); Yuji Matsumoto, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 884 days.

(21) Appl. No.: 13/465,518

(22) Filed: May 7, 2012

(65) Prior Publication Data
US 2012/0292990 A1  Nov. 22, 2012

(30) Foreign Application Priority Data

May 18, 2011 (JP) ................................. 2011-111036

(51) Int. Cl.
*H01M 8/04* (2016.01)
*B60L 11/18* (2006.01)
(Continued)

(52) U.S. Cl.
CPC ....... *B60L 11/1887* (2013.01); *H01M 8/0491* (2013.01); *H01M 8/04597* (2013.01);
(Continued)

(58) Field of Classification Search
CPC ............ B60L 11/1887; B60L 2210/14; H01M 2250/20; H01M 8/04597; H01M 8/04626;
(Continued)

(56) References Cited

U.S. PATENT DOCUMENTS

| 6,920,948 B2 * | 7/2005 | Sugiura ............... B60L 11/1881 180/65.28 |
| 2004/0065489 A1 * | 4/2004 | Aberle ............... B60L 11/1887 180/65.1 |

(Continued)

FOREIGN PATENT DOCUMENTS

| CN | 1914780 A | 2/2007 |
| JP | 2001-307758 A | 11/2001 |

(Continued)

OTHER PUBLICATIONS

Japanese Office Action dated Apr. 16, 2013, issued in corresponding Japanese Patent Application No. 2011-111036, with Partial Translation (4 pages).

(Continued)

*Primary Examiner* — Jared Fureman
*Assistant Examiner* — Emmanuel R Dominique
(74) *Attorney, Agent, or Firm* — Westerman, Hattori, Daniels & Adrian, LLP

(57) ABSTRACT

In a case where a load amount of a load is a predetermined value or less, a control device of an FC vehicle implements extremely low current control for performing power generation at an extremely low current below a lower limit current of an FC for normal operation. At the time of implementing the extremely low current control, upper and lower limit values of a target output voltage of the converter are set in correspondence with the extremely low current, and the output voltage of the FC is controlled to be within a range between the upper and lower limit values.

4 Claims, 11 Drawing Sheets

(51) Int. Cl.
*H01M 8/04858* (2016.01)
*H01M 8/04537* (2016.01)

(52) U.S. Cl.
CPC ..... *H01M 8/04626* (2013.01); *B60L 2210/14* (2013.01); *H01M 2250/20* (2013.01); *Y02T 10/7225* (2013.01); *Y02T 90/32* (2013.01); *Y02T 90/34* (2013.01)

(58) Field of Classification Search
CPC .. H01M 8/0491; Y02E 60/50; Y02T 10/7225; Y02T 90/32; Y02T 90/34
USPC .......................................................... 307/9.1
See application file for complete search history.

(56) References Cited

U.S. PATENT DOCUMENTS

| | | | | |
|---|---|---|---|---|
| 2006/0035115 | A1* | 2/2006 | Norimatsu | H01M 8/04223 429/9 |
| 2008/0220298 | A1* | 9/2008 | Ishikawa | B60L 11/1887 429/431 |
| 2008/0254329 | A1* | 10/2008 | Sugiura | B60L 11/1881 429/430 |
| 2010/0055521 | A1* | 3/2010 | Umayahara | H01M 8/04619 429/429 |
| 2010/0203408 | A1 | 8/2010 | Ono et al. | |
| 2010/0209792 | A1* | 8/2010 | Umayahara | B60L 3/0046 429/429 |
| 2011/0018491 | A1* | 1/2011 | Yoshida | B60L 3/0046 320/101 |
| 2011/0033762 | A1* | 2/2011 | Yoshida | H01M 8/04559 429/428 |

FOREIGN PATENT DOCUMENTS

| | | |
|---|---|---|
| JP | 2004-236384 A | 8/2004 |
| JP | 2010-004600 A | 1/2010 |
| JP | 2010-158102 A | 7/2010 |
| JP | 2011-015580 A | 1/2011 |

OTHER PUBLICATIONS

German Search Report dated Mar. 19, 2013, issued in corresponding German Patent Application No. 1020122081992.
Chinese Office Action dated Mar. 5, 2014, issued in corresponding Chinese Patent Application No. 201210140610.2, w/English translation, (9 pages).

* cited by examiner

METHOD OF CONTROLLING FUEL CELL VEHICLE

CROSS-REFERENCE TO RELATED APPLICATION

This application is based upon and claims the benefit of priority from Japanese Patent Application No. 2011-111036 filed on May 18, 2011, of which the contents are incorporated herein by reference.

BACKGROUND OF THE INVENTION

Field of the Invention

The present invention relates to a method of controlling a fuel cell vehicle including a fuel cell and a load to which electric power is supplied from the fuel cell.

Description of the Related Art

With regard to the fuel cell vehicle, a technique of stopping idling operation of a fuel cell has been proposed (Japanese Laid-Open Patent Publication No. 2001-307758 (hereinafter referred to as "JP 2001-307758 A")). JP 2001-307758 A is aimed to reduce unnecessary power generation in the fuel cell, and achieve improvement in the efficiency of an entire system including a fuel cell and a secondary battery (see "Abstract" therein). In order to achieve the object, in JP 2001-307758 A, depending on the magnitude of a required drive power, whether or not the fuel cell 20 and a group of fuel cell devices including periphery devices of the fuel cell 20 should be operated is determined. If the required drive power can be obtained by power generation of the fuel cell in a low load region which is equal to or less than a threshold power Xps, then operation of the group of fuel cell devices is stopped, and a motor 32 is rotated only by the remaining battery level Q of a secondary battery 30, and the vehicle is driven by the required drive power (see Abstract, FIG. 5, and paragraphs [0047] to [0056] therein).

SUMMARY OF THE INVENTION

As described above, in JP 2001-307758 A, in the case where the required load is low, operation of the group of fuel cell devices is stopped, and electric power from the secondary battery 30 is utilized for driving the vehicle. Therefore, when operation of the group of the fuel cell devices is stopped, presumably, the output voltage of the fuel cell is at the open circuit voltage (OCV) or its neighboring value. If the output voltage of the fuel cell voltage is at the OCV or its neighboring value, degradation of the fuel cell is relatively large (see FIG. 11 of the present application).

FIG. 11 shows an example of the relationship between the electric potential (cell voltage Vcell) [V] of a fuel cell of a fuel cell stack and degradation D of the fuel cell. That is, a curve 200 in FIG. 11 shows the relationship between the cell voltage Vcell and degradation D.

In FIG. 11, electric potentials v1, v2, v3, and v4 are 0.5 V, 0.8 V, 0.9 V, and 0.95 V, respectively. In a region below the electric potential v1 (hereinafter referred to as the "aggregation-increasing region R1"), reduction reaction of platinum (oxidized platinum) contained in the fuel cell proceeds actively, and aggregation of platinum occurs excessively. In a region from the electric potential v1 to the electric potential v2 (e.g. 0.8 V), reduction reaction proceeds stably (hereinafter referred to as the "reduction region R2").

In a region from the electric potential v2 to the electric potential v3 (e.g. 0.9 V), oxidation-reduction reaction of platinum proceeds (hereinafter referred to as the "oxidation reduction region R3"). In a region from the electric potential v3 to the electric potential v4 (e.g. 0.95 V), oxidation reaction of platinum proceeds stably (hereinafter referred to as the "oxidation region R4"). In a region from the electrical potential v4 to the OCV (open circuit voltage), oxidation of carbon in the cell proceeds (hereinafter referred to as the carbon oxidation region R5).

In FIG. 11, the curve 200 is uniquely determined. However, in practice, the curve 200 varies depending on variation of the cell voltage Vcell (varying speed Acell) [V/sec] per unit time. The reduction region R2 includes a minimal value of the curve 200 (first minimal value Vlmi1). The oxidation reduction region R3 includes a maximal value of the curve 200 (maximal value Vlmx). The oxidation region R4 includes another minimal value (second minimal value Vlmi2) of the curve 200.

As can be seen from FIG. 11, degradation D is increased as the cell voltage Vcell increases from the second minimal value Vlim2 to the OCV. Therefore, in JP 2001-307758 A, if operation of the group of the fuel cell devices is stopped, and the output voltage of the fuel cell is at the OCV or its neighboring value, though the power generation efficiency of the fuel cell is high, degradation D of the fuel cell is large.

The present invention has been made taking into account the problems of this type, and an object of the present invention is to provide a method of controlling a fuel cell vehicle, which makes it possible to increase the power generation efficiency of the fuel cell, and suppress degradation of the fuel cell.

A method of controlling a fuel cell vehicle according to the present invention is provided, the fuel cell vehicle including a fuel cell, a converter for controlling an output voltage of the fuel cell, a load to which electric power is supplied from the fuel cell, and a control device for setting a target output of the fuel cell based on a load amount of the load, and instructing the converter of a target voltage of the fuel cell depending on the target output. In the method, in the case where the load amount is a predetermined value or less, the control device implements extremely low current control for performing power generation at an extremely low current below a lower limit current of the fuel cell for normal operation. At the time of implementing the extremely low current control, upper and lower limit values of a target output voltage of the converter are set in correspondence with the extremely low current, and the output voltage of the fuel cell is controlled to be within a range between the upper and lower limit values.

In the present invention, it becomes possible to improve the power generation efficiency of the fuel cell, and suppress degradation of the fuel cell.

That is, in the characteristic of the fuel cell, if the output voltage is at the OCV (open circuit voltage) or its neighboring value, degradation of the fuel cell is high (see FIG. 11). In the present invention, in the case where the load amount of the load is a predetermined value or less, the control device implements extremely low current control for performing power generation at an extremely low current below a lower limit current of the fuel cell for normal operation. At the time of implementing the extremely low current control, upper and lower limit values of a target voltage of the converter are set in correspondence with the extremely low current, and the output voltage of the fuel cell is controlled to be within a range between the upper and lower limit values. Thus, at the time of extremely low current control, it the upper and lower limit values are set to values below the OCV, it becomes possible to suppress degradation of the fuel cell.

Further, in the characteristic of the fuel cell, in the low current region near the OCV, change in the output voltage of the fuel cell relative to change in the output current is large. In the present invention, in the low current region near the OCV, by setting the upper and lower limit values of the target output voltage of the converter in correspondence with the extremely low current, the extremely low current can be outputted highly accurately. Thus, it becomes possible to suppress the increase in the voltage of the fuel cell highly accurately, and prevent degradation of the fuel cell.

In the method, a target current of the fuel cell may be set in correspondence with the extreme low current, and the target output voltage of the converter may be corrected depending on the difference between the target current and an output current of the fuel cell. In this manner, it becomes possible to converge the output current of the fuel cell to the extremely low current further highly accurately.

In the method, a change in a current-voltage characteristic of the fuel cell may be detected, and the upper and lower limit values may be changed based on the change in the current-voltage characteristic. In this manner, it becomes possible to output the extremely low current stably regardless of change in the current-voltage characteristic of the fuel cell.

In the method, the fuel cell vehicle may further include an energy storage device. The load may include a traction motor, and the fuel cell may be capable of supplying electric power to the traction motor and the energy storage device. The energy storage device may be capable of supplying electric power to the traction motor, and being charged with regenerative electric power from the traction motor. In this manner, excessive electric power of the fuel cell at the time of extremely low current control can be used for charging the energy storage device. Thus, at the time of extremely low current control, it becomes possible to suppress degradation of the fuel cell, and increase power generation efficiency of the fuel cell and the energy storage device as a whole.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

1. Description Regarding Overall Structure

[1-1. Overall Structure]

Figure 1:
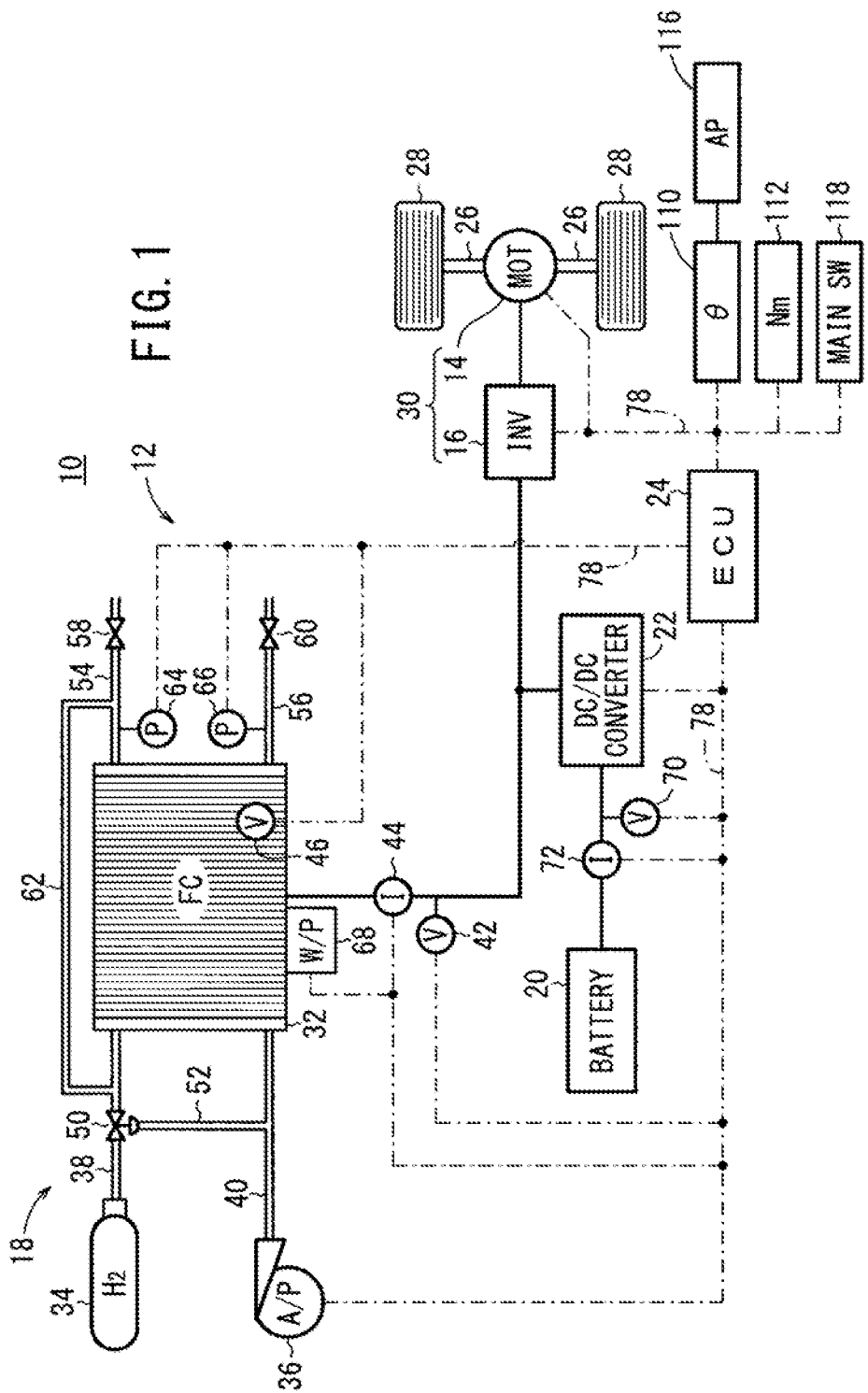
FIG. 1 is a diagram schematically showing a structure of a fuel cell vehicle according to an embodiment of the present invention.

FIG. 1 is a diagram schematically showing a structure of a fuel cell vehicle 10 (hereinafter referred to as the "FC vehicle 10" or "vehicle 10") according to an embodiment of the present invention. The FC vehicle 10 includes a vehicle power supply system 12 (hereinafter referred to as "a power supply system 12"), a traction motor 14, and an inverter (auxiliary device) 16.

The power supply system 12 includes a fuel cell unit 18 (hereinafter referred to as the "FC unit 18"), a battery 20 (energy storage device), a DC/DC converter 22, and an electronic control unit (control device) 24 (hereinafter referred to as the "ECU 24").

[1-2. Drive System]

The motor 14 generates a driving force based on the electric power supplied from the FC unit 18 and the battery 20, and rotates wheels 28 using the driving force through a transmission 26. Further, the motor 14 outputs electric power generated by regeneration (regenerative electric power Preg) [W] to the battery 20. The regenerative electric power Preg may be outputted to a group of auxiliary devices (including an air pump 36, and a water pump 68, as described later).

The inverter 16 has three phase full bridge structure, and carries out DC/AC conversion to convert direct current into alternating current in three phases. The inverter 16 supplies the alternating current to the motor 14, and supplies the direct current after AC/DC conversion as a result of regeneration to the battery 20 or the like through a DC/DC converter 22.

It should be noted that the motor 14 and the inverter 16 are collectively referred to as a load 30. The load 30 may include components (auxiliary device) such as an air pump 36, a water pump 68, etc. to be described later.

[1-3. FC Unit 18]

The FC unit 18 includes a fuel cell stack 32 (hereinafter referred to as "a FC stack 32" or "a FC 32"). For example, the fuel cell stack 32 is formed by stacking fuel cells (hereinafter referred to as the "FC cells") each including an anode, a cathode, and a solid polymer electrolyte membrane interposed between the anode and the cathode. A hydrogen tank 34 and the air pump 36 are connected to the fuel cell stack 32 through their respective passages 38, 40. Hydrogen (fuel gas) as one reactant gas is supplied from the hydrogen tank 34, and a compressed air (oxygen-containing gas) as the other reactant gas is supplied from the air pump 36. Electrochemical reactions of the hydrogen and the air supplied from the hydrogen tank 34 and the air pump 36 to the FC stack 32 occur in the FC stack 32 to generate electric power, and the electric power generated (FC electric power Pfc) [W] in the power generation is supplied to the motor 14 and the battery 20.

The power generation voltage of the FC stack 32 (hereinafter referred to as the "FC voltage Vfc") [V] is detected by a voltage sensor 42, and the power generation current of the FC stack 32 (hereafter referred to as the "FC current Ifc" or "detected FC current Ifc")) (A) is detected by a current sensor 44. The FC voltage Vfc and the FC current Ifc are outputted to the ECU 24. Further, the power generation voltage of each FC cell of the FC stack 32 (hereinafter referred to as the "cell voltage Vcell") [V] is detected by a voltage sensor 46, and outputted to the ECU 24.

A regulator 50 is provided in the passage 38 connecting the hydrogen tank 34 and the FC stack 32. A passage 52 branches from the passage 40 connecting the air pump 36 and the FC stack 32, and the passage 52 is connected to the regulator 50. Compressed air from the air pump 36 is supplied through the passage 52. The regulator 50 changes the opening degree of the valve depending on the pressure of the supplied compressed air, and regulates the flow rate of the hydrogen supplied to the FC stack 32.

A purge valve 58 and a back pressure valve 60 are provided respectively in a hydrogen passage 54 and an air passage 56 provided on the outlet side of the FC stack 32. The purge valve 58 discharges the hydrogen on the outlet side of the FC stack 32 to the outside of the vehicle 10, and the back pressure valve 60 regulates the pressure of the air. Further, a passage 62 connecting the passage 38 on the inlet side of the hydrogen and the passage 54 on the outlet side of the hydrogen is provided. The hydrogen discharged from the FC stack 32 is returned to the inlet side of the FC stack 32 through the passage 62. Pressure sensors 64, 66 are provided in the passages 54, 56 on the outlet side of the FC stack 32, and detection values (pressure values) are outputted from the pressure sensors 64, 66 to the ECU 24, respectively.

Further, the water pump 68 for cooling the FC stack 32 is provided.

[1-4. Battery 20]

The battery 20 is an energy storage device (energy storage) containing a plurality of battery cells. For example, a lithium-ion secondary battery, a nickel hydrogen battery, or a capacitor can be used as the battery 20. In the present embodiment, the lithium-ion secondary battery is used. The output voltage [V] of the battery 20 (hereinafter referred to as the "battery voltage Vbat") is detected by a voltage sensor 70, and the output current [A] of the battery 20 (hereinafter referred to as the "battery current Ibat") is detected by the current sensor 72. The battery voltage Vbat and the battery current Ibat are outputted to the ECU 24. The ECU 24 calculates the remaining battery level (state of charge) (hereinafter referred to as the "SOC") [%] of the battery 20 based on the battery voltage Vbat from the voltage sensor 70 and the battery current Ibat from the current sensor 72.

[1-5. DC/DC Converter 22]

The DC/DC converter 22 controls targets to which the FC electric power Pfc from the FC unit 18, the electric power [W] supplied from the battery 20 (hereinafter referred to as the "battery electric power Pbat"), and the regenerative electric power Preg from the motor 14 are supplied.

Figure 2:
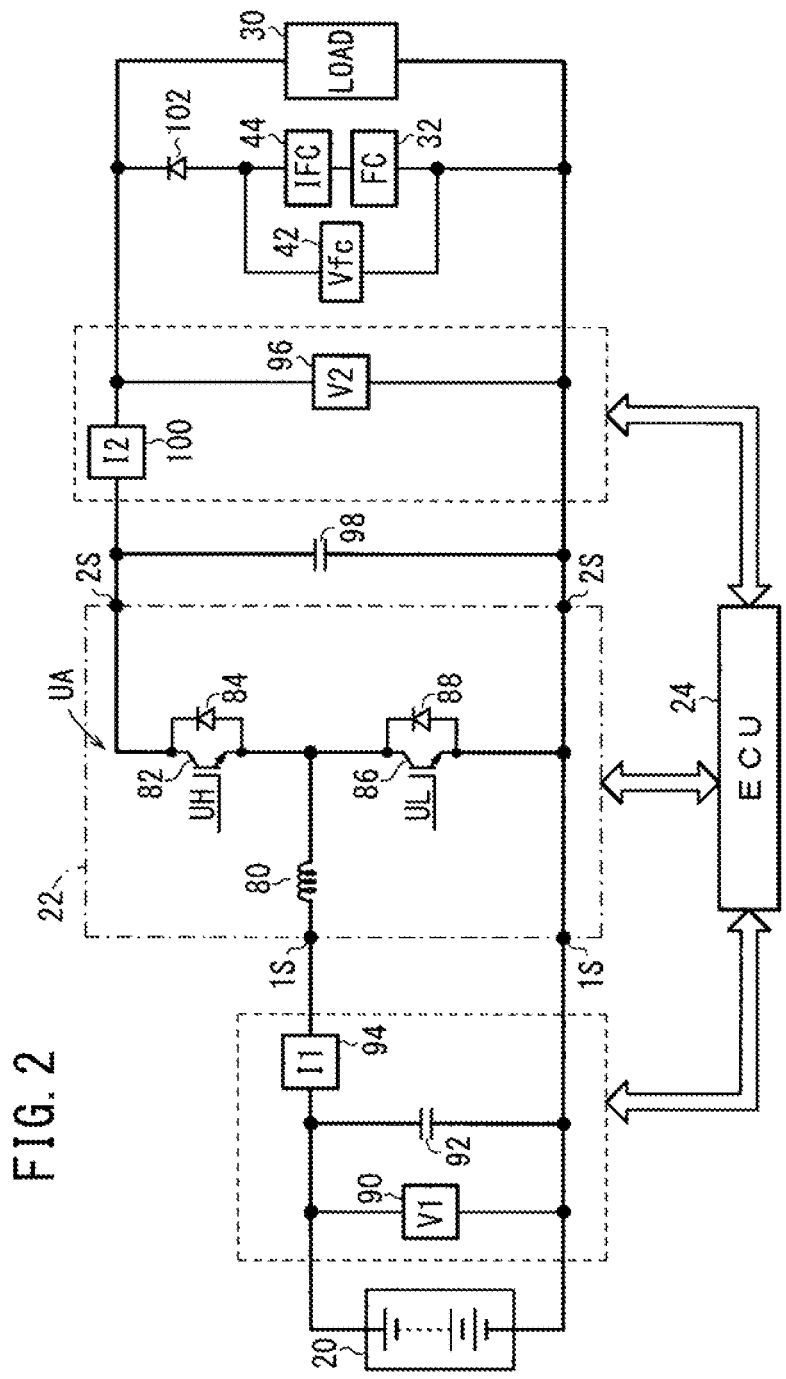
FIG. 2 is a diagram showing details of a DC/DC converter according to the embodiment.

FIG. 2 shows details of the DC/DC converter 22 in the present embodiment. As shown in FIG. 2, one side of the DC/DC converter 22 is connected to the primary side 1S where the battery 20 is provided, and the other side of the DC/DC converter 22 is connected to the secondary side 2S, which is connection points between the load 30 and the FC stack 32.

The DC/DC converter 22 is a chopper type step up/down voltage converter for increasing the voltage on the primary side 1S (primary voltage V1) [V] to the voltage on the secondary side 2S (secondary voltage V2) [V] (V1≤V2), and decreasing the secondary voltage V2 to the primary voltage V1.

As shown in FIG. 2, the DC/DC converter 22 includes a phase arm UA interposed between the primary side 1s and the secondary side 2S, and a reactor 80.

The phase arm UA includes an upper arm element (an upper switching element 82 and a diode 84) and a lower arm element (a lower arm switching element 86 and a diode 88). For example, MOSFET or IGBT is adopted in each of the upper arm switching element 82 and the lower arm switching element 86.

The reactor 80 is interposed between the middle point (common connection point) of the phase arm UA and the positive electrode of the battery 20. The reactor 80 is operated to release and accumulate energy during voltage conversion between the primary voltage V1 and the secondary voltage V2 by the DC/DC converter 22.

The upper arm switching element 82 is turned on when high level of a gate drive signal (drive voltage) UH is outputted from the ECU 24, and the lower arm switching element 86 is turned on when high level of a gate drive signal (drive voltage) UL is outputted from the ECU 24.

The ECU 24 detects primary voltage V1 by a voltage sensor 90 provided in parallel with a smoothing capacitor 92 on the primary side, and detects electrical current on the primary side (primary current I1) [A] by a current sensor 94. Further, the ECU 24 detects secondary voltage V2 by a voltage sensor 96 provided in parallel with the smoothing capacitor 98 on the secondary side, and detects electrical current on the secondary side (secondary current I2) [A] by a current sensor 100. Further, a back flow prevention diode 102 is disposed between the FC 32 and the load 30 (inverter 16) and the DC/DC converter 22.

[1-6. ECU 24]

The ECU 24 controls the motor 14, the inverter 16, the FC unit 18, the battery 20, and the DC/DC converter 22 through a communication line 78 (see FIG. 1). For implementing the control, programs stored in a memory (ROM) are executed, and detection values obtained by various sensors such as the voltage sensors 42, 46, 70, 90, 96, the current sensors 44, 72, 94, 100, and the pressure sensors 64, 66 are used.

The various sensors herein include an opening degree sensor 110, and a motor rotation number sensor 112 (FIG. 1). The opening degree sensor 110 detects the opening degree [degrees] of an accelerator pedal 116 (hereinafter referred to as "an accelerator opening degree θ" or "opening degree θ"). The rotation number sensor 112 detects the rotation number [rpm] of the motor 14 (hereinafter referred to as "motor rotation number Nm" or "rotation number Nm"). Further, a main switch 118 (hereinafter referred to as the "main SW 118") is connected to the ECU 24. The main SW 118 switches between supply and non-supply of the electric power from the FC unit 18 and the battery 20 to the motor 14. This main SW 118 can be operated by a user.

The ECU 24 includes a microcomputer. Further, as necessary, the ECU 24 has a timer and input/output (I/O) interfaces such as an A/D converter and a D/A converter. The ECU 24 may comprise only a single ECU. Alternatively, the ECU 24 may comprise a plurality of ECUs for each of the motor 14, the FC unit 18, the battery 20, and the DC/DC converter 22.

After the load required by the power supply system 12, i.e., required by the FC vehicle 10 as a whole, is determined based on the state of the FC stack 32, the state of the battery 20, and the state of the motor 14, and also based on inputs (load requests) from various switches and various sensors, the ECU 24 determines allocation (shares) of loads through adjustment, and more specifically determines a good balance among a load which should be assigned to the FC stack 32, a load which should be assigned to the battery 20, and a load which should be assigned to the regenerative power supply (motor 14), and sends instructions to the motor 14, the inverter 16, the FC unit 18, the battery 20, and the DC/DC converter 22.

2. Control According to Present Embodiment

Next, control in the ECU 24 will be described.

[2-1. Basic Control]

Figure 3:
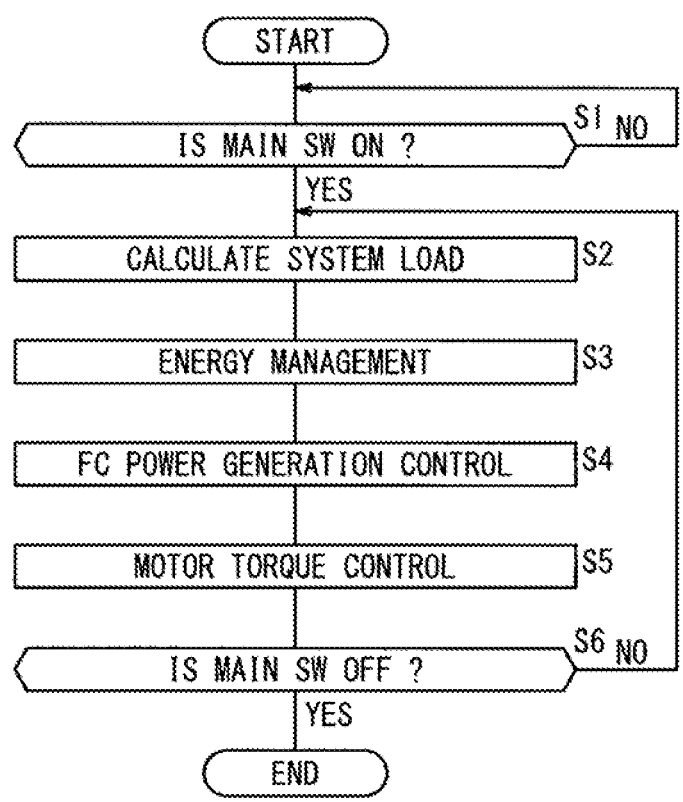
FIG. 3 is a flow chart showing basic control in an electronic control unit (ECU)

FIG. 3 is a flow chart showing basic control in the ECU 24. In step S1, the ECU 24 determines whether or not the main SW 118 is in an ON state. If the main SW 118 is not in the ON state (S1: NO), step S1 is repeated. If the main SW 118 is in the ON state (S1: YES), the control proceeds to step S2. In step S2, the ECU 24 calculates the load (system load Ls) [W] required by the power supply system 12.

In step S3, the ECU 24 performs energy management of the power supply system 12. The energy management herein is a process of calculating the power generation amount of the FC 32 (FC electric power Pfc) and the output of the battery 20 (battery output Pbat). The energy management is intended to suppress degradation of the FC stack 32, and improve the efficiency in the output of the entire power supply system 12.

Specifically, based on the system load Ls calculated in step S2, the ECU 24 determines allocation (shares) of a fuel cell's load (requested output) Lfc which should be assigned to the FC 32, a battery's load (requested output) Lbat which should be assigned to the battery 20, and a regenerative power supply's load Lreg which should be assigned to the regenerative power supply (motor 14) through adjustment.

In step S4, based on the fuel cell's load Lfc or the like determined in step S3, the ECU 24 implements control (FC power generation control) of peripheral devices of the FC stack 32, i.e., the air pump 36, the purge valve 58, the back pressure valve 60, and the water pump 68. In step S5, the ECU 24 implements torque control of the motor 14, e.g., based on the motor rotation number Nm from the rotation number sensor 112 and the opening degree θ of the accelerator pedal 116 from the opening degree sensor 110.

In step S6, the ECU 24 determines whether or not the main SW 118 is in an OFF state. If the main SW 118 is not in the OFF state (56: NO), the control returns to step S2. If the main SW 118 is in the ON state (S6: YES), the current process is finished.

[2-2. Output Control of FC 32]

In the present embodiment, a target value of the FC current Ifc (hereinafter referred to as the "target FC current Ifctgt") is set depending on the fuel cell's load Lfc determined in the energy management of step S3. Then, in order to achieve the target FC current Ifctgt, the secondary voltage V2 of the DC/DC converter 22 is controlled.

More specifically, by the characteristic of the FC 32, basically, the FC voltage Vfc is equal to the secondary voltage V2 of the DC/DC converter 22. Thus, by adjusting the secondary voltage V2 by the DC/DC converter 22, it becomes possible to control the FC voltage Vfc. Further, by the current-voltage (I-V) characteristic of the FC 32, the FC current Ifc can be controlled by controlling the FC voltage Vfc. Thus, in the present embodiment, the FC voltage Vfc and the FC current Ifc is controlled using the target value of the secondary voltage V2 (hereinafter referred to as the "target secondary voltage V2tgt").

(2-2-1. Summary of Calculation of Target Secondary Voltage V2tgt)

Figure 4:
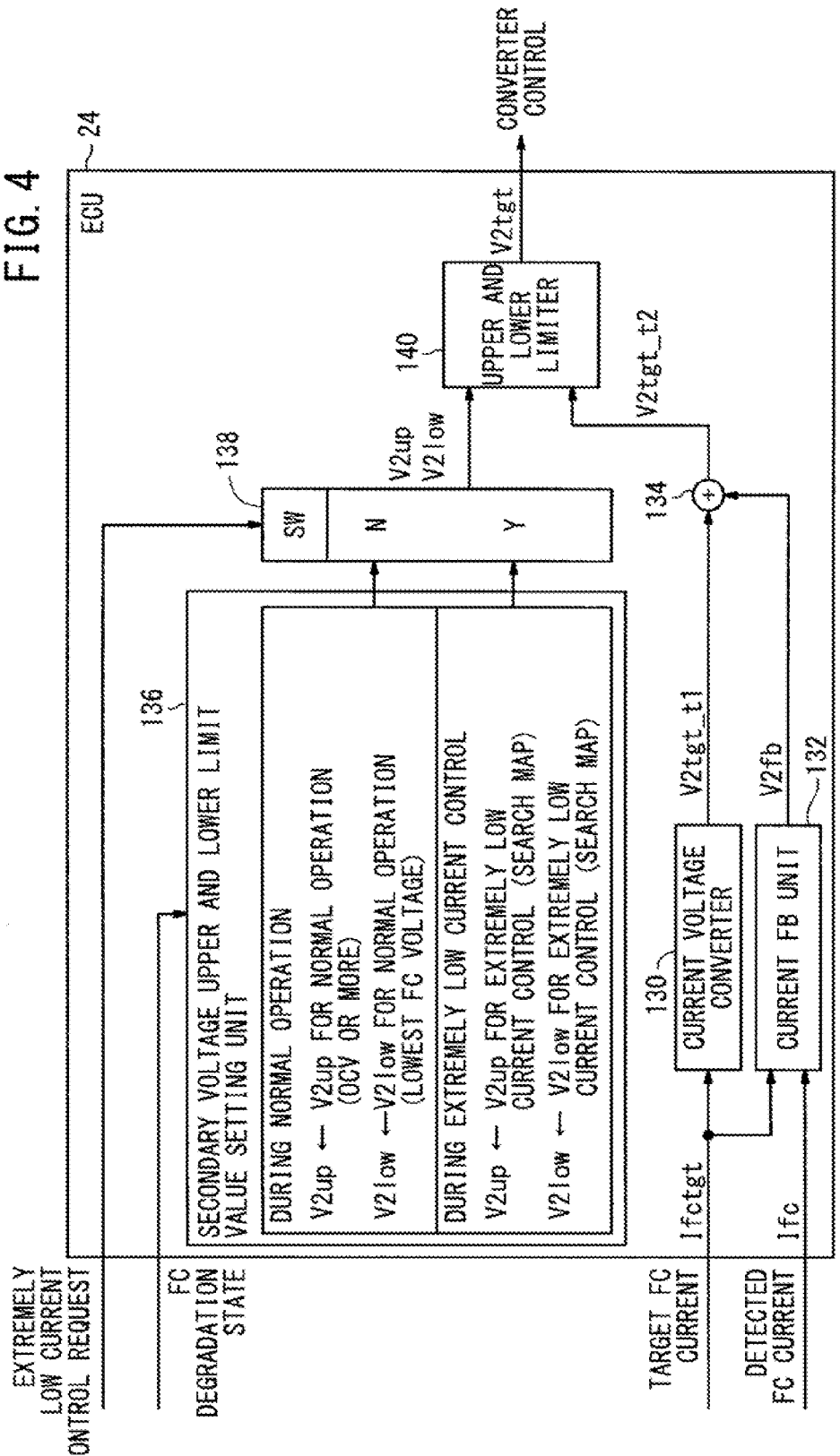
FIG. 4 is a functional block diagram for calculating a target value (target secondary voltage) of a secondary voltage V2 of the DC/DC converter by the ECU.

FIG. 4 is a functional block diagram for calculating the target secondary voltage V2tgt of the DC/DC converter 22 by the ECU 24. As shown in FIG. 4, the ECU 24 includes a current-voltage converter 130, a current feedback unit 132 (hereinafter referred to as the "current FB unit 132"), an adder 134, a secondary voltage upper and lower limit value setting unit 136, an extremely low current control selection switch 138 (hereinafter referred to as the "selection switch 138"), and an upper and lower limiter 140.

The current-voltage converter 130 converts the target FC current Ifctgt into a first provisional target secondary voltage V2tgt_t1. That is, a map of the I-V characteristic showing the relationship between the target FC current Ifctgt and the first provisional target secondary voltage V2tgt_t1 is prepared beforehand, and the first provisional target secondary voltage V2tgt_t1 is set based on the map. Stated otherwise, the first provisional target secondary voltage V2tgt_t1 is a target secondary voltage V2tgt which can be determined directly from the target FC current Ifctgt based on the I-V characteristic.

The current FB unit 132 calculates a feedback term of the secondary voltage V2 (hereinafter referred to as the "secondary voltage FB value V2fb") based on the difference ΔIfc between the target FC current Ifctgt and the detected FC current Ifc. Specifically, PID (proportional-integral-derivative) control is implemented on the difference ΔIfc thereby to calculate the secondary voltage FB value V2fb.

The adder 134 calculates the second provisional target secondary voltage V2tgt_t2 by summing the first provisional target secondary voltage V2tgt_t1 from the current-voltage converter 130 and the secondary voltage FB value V2fb from the current FB unit 132. Stated otherwise, the second provisional target secondary voltage V2tgt_t2 is a target secondary voltage V2tgt after implementing feedback control on the first provisional target secondary voltage V2tgt_t1 based on the difference ΔIfc.

The secondary voltage upper and lower limit value setting unit 136 sets an upper limit value of the target secondary voltage V2tgt (hereinafter referred to as the "upper limit value V2up" or the "upper limit voltage V2up"), and a lower limit value of the target secondary voltage V2tgt (hereinafter referred to as the "lower limit value V2low" or the "lower limit voltage V2low"). In the present embodiment, the upper limit voltage V2up and the lower limit voltage V2low for normal operation and the upper limit voltage V2up and the lower limit voltage V2low for extremely low current control are set. The upper limit voltage V2up for normal operation is set to a value, e.g., above the OCV. Further, the lower limit voltage V2low for normal operation is set to the lowest voltage of the FC 32 (lowest FC voltage), i.e., a minimum value that can be set as the target secondary voltage V2tgt.

Further, the extremely low current control is implemented such that, in the case where the system load Ls is low, power generation is performed at extremely low current (hereinafter referred to as "extremely low current Ivlow") below the lower limit value of the secondary current for normal operation (hereinafter referred to as the "lower limit value Inmllow" or "lower limit current Inmllow"). In the present embodiment, for example, the extremely low current Ivlow is controlled within a range of ±α with reference current Ivlowref at the center value for extremely low current control (as described later with reference to FIGS. 7 and 8).

For example, the case where the system load Ls is low herein means a case where the system load Ls is equal to or less than a low load determination threshold value THLs1 (hereinafter referred to as the "threshold value THLs1") indicating that the system load Ls is low, or a case where the vehicle velocity V [km/h] is equal to or less than a low load determination threshold value THV1 (hereinafter referred to as the "threshold value THV1") indicating that the system load Ls is low. The vehicle velocity V is calculated by the ECU 24 based on the motor rotation number Nm.

Figure 5:
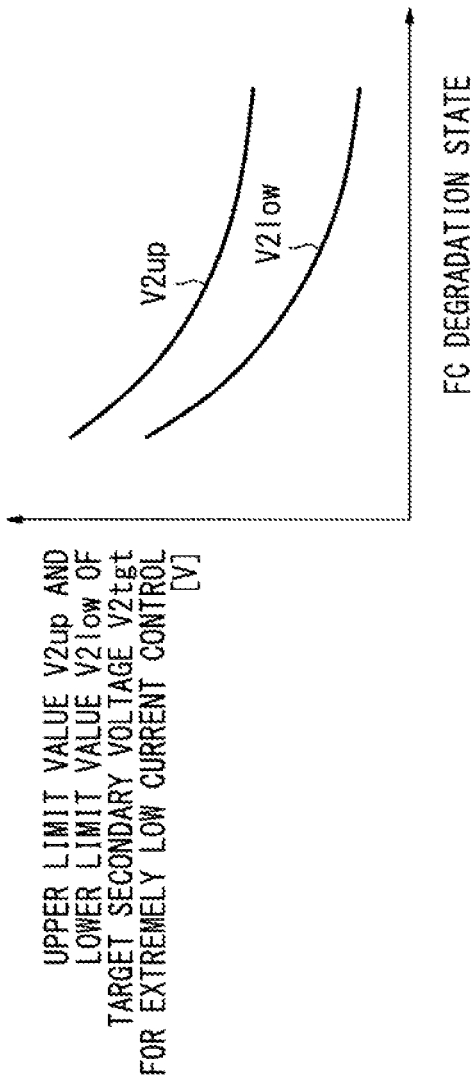
FIG. 5 is a graph showing the relationship between the degradation state of the fuel cell and an upper limit value and a lower limit value of the target secondary voltage.

Further, the upper limit voltage V2up and the lower limit voltage V2low are set depending on the degradation state of the FC 32. Specifically, using a map shown in FIG. 5, the upper limit voltage V2up and the lower limit voltage V2low are set depending on the degradation state of the FC 32. In the map of FIG. 5, as the degradation of the FC 32 progresses (i.e., as the degradation state goes to the right side in FIG. 5), the upper limit voltage V2up and the lower limit voltage V2low are decreased in accordance with change in the I-V characteristic.

The degradation state of the FC 32 herein is determined by the ECU 24. In the present embodiment, for example, the degradation state of the FC 32 is presented by the operating time period of the FC 32. The operating time period of the FC 32 is updated, and recorded in a nonvolatile memory (not shown) by counting the number of times the FC 32 has been used. Alternatively, instead of the operating time period of the FC 32, the I-V characteristic can be identified based on the measured values of the FC voltage Vfc and the FC current Ifc. The manner of setting the upper limit voltage V2up and the lower limit voltage V2low will be described in detail below.

When there is no extremely low current control request (this is denoted by "N" in FIG. 4), an extremely low current control selection switch 138 outputs the upper limit voltage V2up and the lower limit voltage V2low for the normal operation, and when there is an extremely low current control request (this is denoted by "Y" in FIG. 4), and the extremely low current control selection switch 138 outputs the upper limit voltage V2up and the lower limit voltage V2low for the extremely low current control.

The extremely low current control request is generated by the ECU 24 depending on the system load Ls. Specifically, if the system load Ls is the low load determination threshold THLs1 or less, i.e., if the system load Ls is low, the extremely low current control request is outputted, and if the system load Ls is more than the threshold value THLs1, the ECU 24 does not output the extremely low current control request.

The upper and lower limiter 140 limits the second provisional target secondary voltage V2$tgt$_t2 from the adder 134 by use of the upper limit voltage V2up and the lower limit voltage V2low from the selection switch 138. Specifically, in the case where the second provisional target secondary voltage V2$tgt$_t2 is between the lower limit voltage V2low and the upper limit voltage V2up (V2low ≤ V2$tgt$_t2 ≤ V2up), the upper and lower limiter 140 outputs the second provisional target secondary voltage V2$tgt$_t2 directly as the target secondary voltage V2$tgt$. The target secondary voltage V2$tgt$ is used for calculating the drive duty of the DC/DC converter 22.

Further, if the second provisional target secondary voltage V2$tgt$_t2 exceeds the upper limit voltage V2up (V2$tgt$_t2>V2up), the upper and lower limiter 140 outputs the upper limit voltage V2up as the target secondary voltage V2$tgt$. If the second provisional target secondary voltage V2$tgt$_t2 is less than the lower limit voltage V2low (V2$tgt$_t2<V2low), the upper and lower limiter 140 outputs the lower limit voltage V2low as the target secondary voltage V2$tgt$. Thus, the target secondary voltage V2$tgt$ is regulated to be within a range between the upper limit voltage V2up and the lower limit voltage V2low, and the FC current Ifc is regulated to be within a target current region for extremely low current control.

The target secondary voltage V2$tgt$ outputted from the upper and lower limiter 140 is used for computation of the drive duty of the DC/DC converter 22 in another computation module (not shown) of the ECU 24.

(2-2-2. Flow of Calculating Target Secondary Voltage V2$tgt$)

Figure 6:
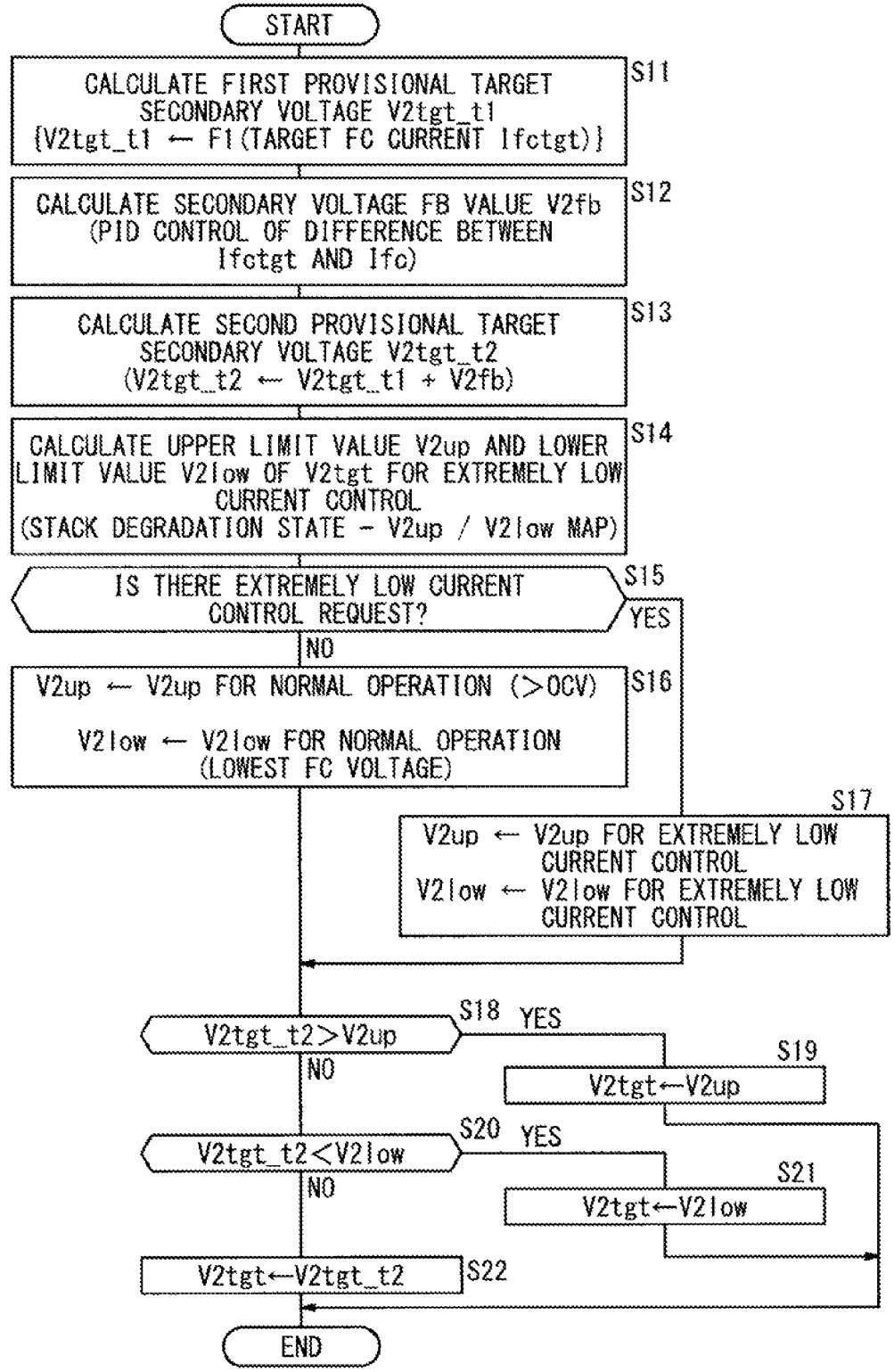
FIG. 6 is a flow chart for calculating the target secondary voltage by the ECU.

FIG. 6 is a flow chart for calculating the target secondary voltage V2$tgt$ by the ECU 24. In step S11, the ECU 24 (current-voltage converter 130) calculates the first provisional target secondary voltage V2$tgt$_t1 based on the target FC current Ifctgt. That is, in the I-V characteristic of FC 32, the FC voltage Vfc corresponding to the target FC current Ifctgt is set as the first provisional target secondary voltage V2$tgt$_t1. In step S12, the ECU 24 (current FB unit 132) calculates the second voltage FB value V2$fb$. Specifically, the ECU 24 implements PID control of the difference ΔIfc between the target FC current Ifctgt and the detected FC current IFC thereby to determine the secondary voltage FB value V2$fb$.

In step S13, the ECU 24 (adder 134) calculates the second provisional target secondary voltage V2$tgt$_t2. Specifically, the second provisional target secondary voltage V2$tgt$_t2 is determined as the sum of the first provisional target secondary voltage V2$tgt$_t1 determined in step S11 and the secondary voltage FB value V2$fb$.

In step S14, the ECU 24 (upper and lower limit value setting unit 136) calculates the upper limit value V2up and the lower limit value V2low of the target secondary voltage V2$tgt$ for extremely low current control. As described above, the upper limit value V2up and the lower limit value V2low for extremely low current control are determined using the map of FIG. 5.

In step S15, the ECU 24 (selection switch 138) determines whether or not there is an extremely low current control request. If there is no extremely low current control request (S15: NO), in step S16, the ECU 24 (selection switch 138) uses the upper limit value V2up and the lower limit value V2low for normal operation. If there is an extremely low current control request (S15: YES), in step S17, the ECU 24 (selection switch 138) uses the upper limit value V2up and the lower limit value V2low for the extremely low current control.

In step S18, the ECU 24 (upper and lower limiter 140) determines whether or not the second provisional target secondary voltage V2$tgt$_t2 exceeds the upper limit value V2up. If the second provisional target secondary voltage V2$tgt$_t2 exceeds the upper limit value V2up (S18: YES), in step S19, the ECU 24 (upper and lower limiter 140) sets the upper limit value V2up as the target secondary voltage V2$tgt$. If the second provisional target secondary voltage V2$tgt$_t2 is the upper limit value V2up or less (S18: NO), the process proceeds to step S20.

In step S20, the ECU 24 (upper and lower limiter 140) determines whether or not the second provisional target secondary voltage V2$tgt$_t2 is less than the lower limit value V2low. If the second provisional target secondary voltage V2$tgt$_t2 is less than the lower limit value V2low (S20: YES), in step S21, the ECU 24 (upper and lower limiter 140) sets the lower limit value V2low as the target secondary voltage V2$tgt$. If the second provisional target secondary voltage V2$tgt$_t2 is the lower limit value V2low or more (S20: NO), in step S22, the ECU 24 (upper and lower limiter 140) sets the second provisional target secondary voltage V2tgt_t2 directly as the target secondary voltage V2tgt.

(2-2-3. Extremely Low Current Control)

Figure 7:
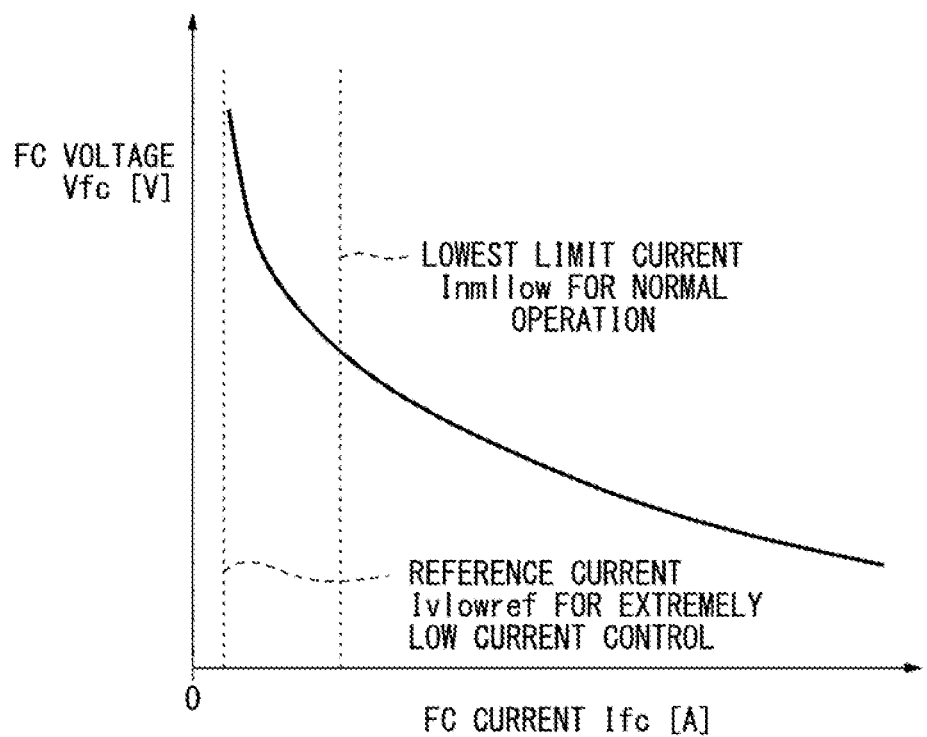
FIG. 7 is a graph showing the relationship between the lower limit current during normal operation and reference current during extremely low current control.
Figure 8:
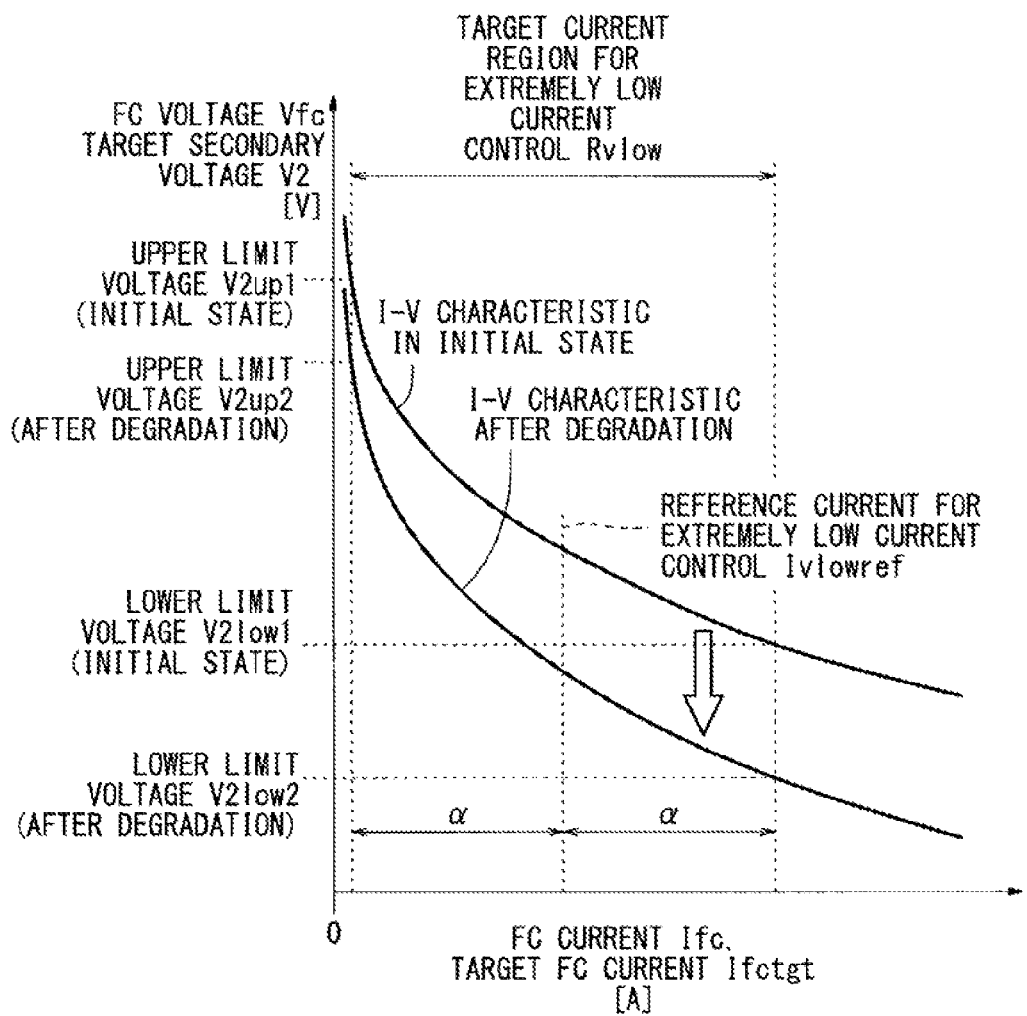
FIG. 8 is a graph showing the relationship between the reference current during extremely low current control and upper and lower limit values of FC voltage and target secondary voltage, and the relationship between the current-voltage (I-V) characteristic at an initial state of the FC and the I-V characteristic after degradation of the FC.

FIG. 7 shows the relationship between the lower limit current Inmllow during normal operation and the reference current Ivlowref during extremely low current control. FIG. 8 shows the relationship between the reference current Ivlowref during extremely low current control and the upper and lower limit values V2up, V2low of the FC voltage Vfc and the target secondary voltage V2tgt, and the relationship between the current-voltage (I-V) characteristic at the initial state of the FC 32 and the I-V characteristic after degradation of the FC 32.

The reference current Ivlowref is the center value of the target range (target current region) of the extremely low current Ivlow during extremely low current control. As shown in FIG. 8, at the time of implementing extremely low current control, a region of ±α with the reference current Ivlowref at the center value is set as the target current region Rvlow. The value α defines the target current region Rvlow for extremely low current control.

Further, in the I-V characteristic at the initial state, the upper limit voltage V2up1 corresponds to the lower limit current of the target current region Rvlow, and the lower limit voltage V2low1 corresponds to the upper limit current of the target current region Rvlow. As degradation of the FC 32 progresses, the FC voltage Vfc corresponding to the FC current Ifc is decreased. Thus, in the I-V characteristic after degradation, the upper limit voltage V2up2 corresponds to the lower limit current of the target current region Rvlow, and the lower limit voltage V2low2 corresponds to the upper limit current of the target current region Rvlow.

In the present embodiment, data of changes in the I-V characteristic as described above is stored in advance as a map of FIG. 5 to use this data.

3. Advantages of the Present Embodiment

As described above, in the present embodiment, it becomes possible to achieve improvement in the power generation efficiency of the FC 32 or the power supply system 12 as a whole, and suppress degradation of the FC 32.

Figure 11:
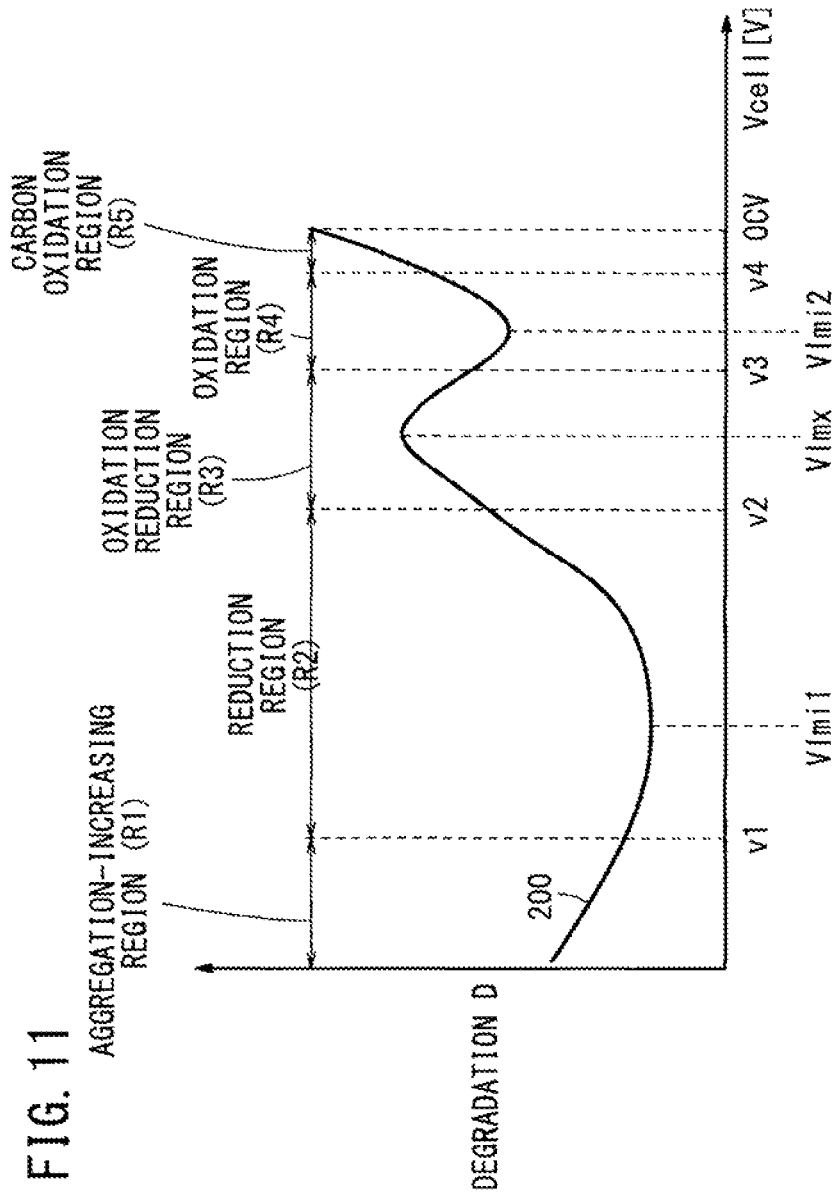
FIG. 11 is a graph showing an example of the relationship between the electric potential of a fuel cell of a fuel cell stack and degradation of the fuel cell.

That is, in the characteristic of the FC 32, if the FC voltage Vfc is at the OCV or its neighboring value, degradation D is large (FIG. 11). In the present embodiment, in the case where the system load Ls is the threshold THLs1 or less, extremely low current control is implemented to perform power generation at the extremely low current Ivlow below the lower limit value of the FC 32 for normal operation. At the time of extremely low current control, the upper limit value V2up and the lower limit value V2low of the target secondary voltage V2tgt are set in correspondence with the extremely low current Ivlow (S17 of FIG. 6), and control is implemented so as to adjust the FC voltage Vfc to be between the upper limit value V2up and the lower limit value V2low. Therefore, at the time of extremely low current control, by setting the upper limit value V2up and the lower limit value V2low to values less than the OCV, it becomes possible to suppress degradation D of the FC 32.

Further, in the characteristic of the FC 32, in the low current region near the OCV, change of the FC voltage Vfc is large relative to change of the FC current Ifc (see FIG. 7). In the present embodiment, in the low current region near the OCV, the upper limit value V2up and the lower limit value V2low of the target secondary voltage V2tgt are set in correspondence with the extremely low current Ivlow. Thus, the extremely low current Ivlow can be outputted highly accurately. Accordingly, it becomes possible to suppress the increase in the FC voltage Vfc highly accurately, and prevent degradation of the FC 32.

In the present embodiment, the target FC current Ifctgt is set in correspondence with the extremely low current Ivlow. Based on the difference ΔIfc between the target FC current Ifctgt and the FC current Ifc, the target secondary voltage V2tgt is corrected (see current FB unit 132 in FIG. 4). In this manner, it becomes possible to converge the FC current Ifc to the extremely low current Ivlow further highly accurately.

In the present embodiment, based on change in the degradation state of the FC 32, the upper limit value V2up and the lower limit value V2low of the target secondary voltage V2tgt are changed (FIG. 5). Thus, regardless of change in the I-V characteristic of the FC 32, it becomes possible to output the extremely low current Ivlow stably.

In the present embodiment, the FC 32 can supply electrical energy to the motor 14 and the battery 20. The battery 20 can supply electric power to the motor 14, and can be charged with regenerative electric power Preg from the motor 14. Thus, during extremely low current control, excessive electric power from the FC 32 can be used for charging the battery 20. Accordingly, it becomes possible to suppress degradation of the FC 32, and achieve improvement in the power generation efficiency of the FC 32 and the battery 20 as a whole.

4. Modified Embodiment

The present invention is not limited to the above described embodiment. The present invention can adopt various structures based on the description herein. For example, the following structure may be adopted.

[4-1. Application of Power Supply System]

Though the power supply system 12 is mounted in the FC vehicle 10 in the above described embodiment, the present invention is not limited in this respect. The power supply system 12 may be mounted in other objects. For example, the power supply system 12 may be used in movable objects such as electric power-assisted bicycles, ships, or air planes. Alternatively, the power supply system 12 may be applied to household power systems.

[4-2. Structure of Power Supply System 12]

Figure 9:
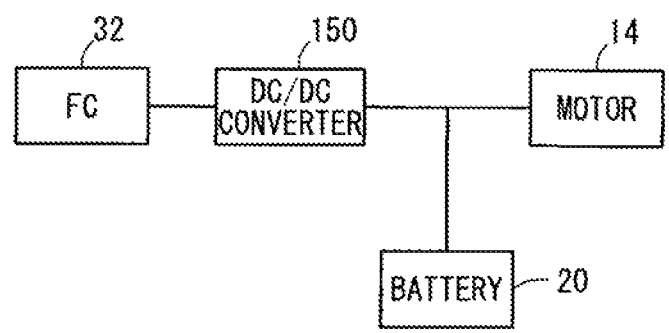
FIG. 9 is a block diagram schematically showing a structure of a first modified example of a power system according to the embodiment.
Figure 10:
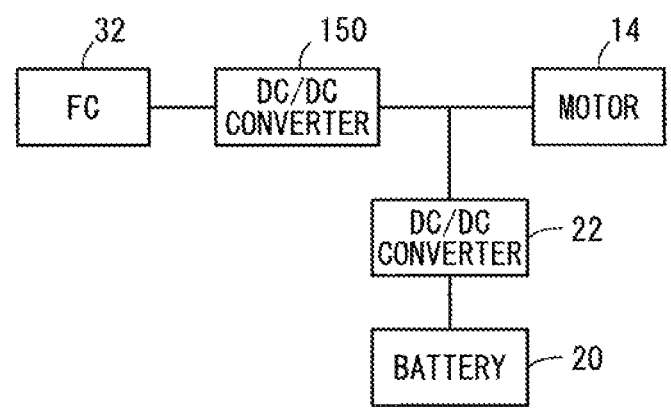
FIG. 10 is a block diagram schematically showing a structure of a second modified example of a power system according to the embodiment.

In the embodiments, the FC 32 and the battery 20 are arranged in parallel, and the DC/DC converter 22 is provided on the near side the battery 20. However, the present invention is not limited in this respect. For example, as shown in FIG. 9, the FC 32 and the battery 20 may be provided in parallel, and a step-up, step-down, or step-up/step-down DC/DC converter 150 may be provided on the near side of the FC 32. Alternatively, as shown in FIG. 10, the FC 32 and the battery 20 may be provided in parallel, the DC/DC converter 150 may be provided on the near side of the FC 32, and the DC/DC converter 22 may be provided on the near side of the battery 20.

In the above embodiment, the FC electric power Pfc is outputted to the motor 14 and the battery 20. However, the present invention is not limited in this respect. For example, the FC electric power Pfc may be outputted to the motor 14, the battery 20, and the group of auxiliary devices (including the air pump 36, the water pump 68, or the like). Alternatively, the FC electric power Pfc may be outputted only to the motor 14. Alternatively, the FC electric power Pfc may be outputted only to the group of auxiliary devices.

[4-3. Extremely Low Current Control]

In the above embodiment, whether or not the extremely low current control should be performed is determined based on whether or not there is an extremely low current control request (S15 of FIG. 6). Further, whether or not the extremely low current control request should be generated is determined based on whether or not the system load Ls is the threshold value THLs1 or less. However, the manner of determining whether or not the extremely low current control should be performed is not limited as long as the determination is made depending on the system load Ls or the load of the motor 14. For example, whether or not the extremely low current control should be performed is determined based on whether or not the accelerator opening degree θ is equal to or less than a threshold value representing that deceleration is required or maintenance of a stopped state is required.

In the above embodiment, in the extremely low current control, one reference current Ivlowref and one target current region Rvlow are set. However, the present invention is not limited in this respect. For example, when the vehicle velocity V is below a velocity that requires extremely low current control, the reference current Ivlowref and the target current region Rvlow may be changed depending on the vehicle velocity V.

In the above embodiment, the secondary voltage FB value V2$fb$ is calculated based on the difference ΔIfc between the target FC current Ifctgt and the detected FC current Ifc, and the target secondary voltage V2$tgt$ is calculated using the secondary voltage FB value V2$fb$ (see FIG. 4). However, a configuration without the calculation of the secondary voltage FB value V2$fb$ may be adopted.

In the above embodiment, the upper limit value V2up and the lower limit value V2low of the target secondary voltage V2$tgt$ (second provisional target secondary voltage V2$tgt$_t2) are set depending on the degradation state of the FC 32. However, the upper limit voltage V2up and the lower limit voltage V2low may be set based on other factors that change I-V characteristic of the FC 32. As an example of such factors, for example, a dry state of the FC 32 may be used. In this case, a humidity sensor is provided for the FC 32, and the detection value of the humidity sensor can be used to determine the dry state.

While the invention has been particularly shown and described with reference to a preferred embodiment, it will be understood that variations and modifications can be effected thereto by those skilled in the art without departing from the spirit of the invention as defined by the appended claims.

What is claimed is:

1. A method of controlling a fuel cell vehicle comprising: a fuel cell; a converter for controlling an output voltage of the fuel cell; a load to which electric power is supplied from the fuel cell; and a control circuit for setting a target output of the fuel cell based on a load amount of the load, and instructing the converter of a target voltage of the fuel cell depending on the target output, the method comprising:

in a case where the load amount is a predetermined value or less, having the control circuit to implement extremely low current control for performing power generation at an extremely low current within a current range below a lower limit current of the fuel cell for normal operation; and at the time of implementing the extremely low current control, having the control circuit to set upper and lower limit values of a target output voltage of the converter in correspondence with the extremely low current based on a change in a current-voltage characteristic of the fuel cell, and controlling the output voltage of the fuel cell to be within a range between the upper and lower limit values.

2. The method of controlling the fuel cell vehicle according to claim 1, further comprising: setting a target current of the fuel cell in correspondence with the extremely low current, and correcting the target output voltage of the converter depending on a difference between the target current and an output current of the fuel cell.

3. The method of controlling the fuel cell vehicle according to claim 1, further comprising: detecting a change in a current-voltage characteristic of the fuel cell, and changing the upper and lower limit values based on the change in the current-voltage characteristic.

4. The method of controlling the fuel cell vehicle according to claim 1, wherein the fuel cell vehicle further comprises an energy storage device;

the load includes a traction motor;

the fuel cell is capable of supplying electric power to the traction motor and the energy storage device; and the energy storage device is capable of supplying electric power to the traction motor, and being charged with regenerative electric power from the traction motor.

* * * * *